United States Patent
Covell et al.

(10) Patent No.: US 8,447,032 B1
(45) Date of Patent: May 21, 2013

(54) GENERATION OF MIN-HASH SIGNATURES

(75) Inventors: Michele Covell, Palo Alto, CA (US);
Sergey Ioffe, Mountain View, CA (US);
Shumeet Baluja, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1346 days.

(21) Appl. No.: 12/042,138

(22) Filed: Mar. 4, 2008

Related U.S. Application Data (60) Provisional application No. 60/957,445, filed on Aug. 22, 2007.

(51) Int. Cl.
*H04L 9/00* (2006.01)

(52) U.S. Cl.
USPC .............. 380/28; 726/30; 726/31; 726/32

(58) Field of Classification Search
USPC ........................................... 380/28
See application file for complete search history.

(56) References Cited

U.S. PATENT DOCUMENTS

| | | | |
|---|---|---|---|
| 5,973,723 A | 10/1999 | DeLuca | |
| 8,094,872 B1 * | 1/2012 | Yagnik et al. ............... | 382/100 |
| 2006/0271947 A1 | 11/2006 | Lienhart et al. | |
| 2007/0071330 A1 | 3/2007 | Oostveen et al. | |
| 2007/0124756 A1 | 5/2007 | Covell et al. | |

FOREIGN PATENT DOCUMENTS

| WO | WO 2005/116793 A1 | 12/2005 |
|---|---|---|

OTHER PUBLICATIONS

U.S. Appl. No. 12/536,907, filed Aug. 6, 2009, 51 pages.
U.S. Appl. No. 12/569,827, filed Sep. 29, 2009, 56 pages.
U.S. Appl. No. 11/765,292, filed Jun. 19, 2007, 39 pages.
U.S. Appl. No. 12/237,397, filed Sep. 25, 2008, 34 pages.
U.S. Appl. No. 12/697,880, filed Feb. 1, 2010, 32 pages.
First Office Action for Chinese Patent Application No. CN 200880110557.3 mailed Oct. 10, 2011, 6 pages.
Australian Office Action, Australian Application No. 2008288797, Jun. 12, 2012, 2 pages.
Canadian Office Action, Canadian Application No. 2,696,890, Jun. 15, 2012, 2 pages.
Chinese Second Office Action, Chinese Application No. 200880110557.3, Jun. 11, 2012, 9 pages.
Chinese Third Office Action, Chinese Application No. 200880110557.3, Nov. 21, 2012, 7 pages.
Baluja, S., "Content Fingerprinting Using Wavelets," $3^{rd}$ European Conference on Visual Media Production, Nov. 29, 2006, pp. 198-207.
Oostveen, J., et al., "Feature extractions and a Database Strategy for Video Fingerprinting," Lecture Notes in Computer Science/Computational Science, Mar. 11, 2002, pp. 117-128, vol. 2314.

(Continued)

*Primary Examiner* — Longbit Chai
(74) *Attorney, Agent, or Firm* — Fenwick & West LLP (57) ABSTRACT

A computer-implemented method is disclosed for generating a signature representing an input bit vector. A signature generator generates a primary min-hash value based on a primary permutation from a sequence of permutation blocks. If the primary min-hash value is lower than a threshold value, a secondary min-hash value is generated based on a secondary permutation from the same permutation block. The signature generator then determines one or more signature values based on the primary min-hash value, the secondary min-hash value or both. The one or more signature values are stored as elements of the signature.

18 Claims, 9 Drawing Sheets

OTHER PUBLICATIONS

Yang, X.F., et al., "Efficient Short Video Repeat Identification with Application to News Video Structure Analysis," IEEE Transactions on Multimedia, Apr. 1, 2007, pp. 600-609, vol. 9, No. 3.

Supplementary European Search Report for European Patent Application No. EP 08798558, Dec. 5, 2012, 9 pages.

Shumeet Baluja et al., *Audio Fingerprinting: Combining Computer Vision & Data Stream Processing*, IEEE International Conference on Acoustics, Speech and Signal Processing (ICASSP 2007), Apr. 15-20, 2007, pp. II-213-II-216, vol. 2.

Shumeet Baluja et al., *Content Fingerprinting Using Wavelets*, 3rd European Conference on Visual Media Production, 2006, pp. 198-207.

Ondrej Chum et al., *Scalable Near Identical Image and Shot Detection*, Conference on Image and Audio Video Retrieval, Proceedings of the 6th ACM International Conference on Image and Video Retrieval, 2007, pp. 549-556, ACM. N.Y., USA.

Edith Cohen et al., *Finding Interesting Associations without Support Pruning*, IEEE Transactions on Knowledge and Data Engineering, 2001, pp. 64-78, vol. 13, Issue 1.

Michele Covell et al., *Known-Audio Detection Using Waveprint: Spectrogram Fingerprinting by Wavelet Hashing*, International Conference on Acoustics, Speech and Signal Processing (ICASSP-2007), 2007.

Charles E. Jacobs et al., *Fast Multiresolution Image Querying*, International Conference on Computer Graphics and Interactive Techniques, Proceedings of the 22nd Annual Conference on Computer Graphics and Interactive Techniques, 1995, pp. 277-286, ACM, U.S.A.

Ting Liu et al., *Clustering Billions of Images with Large Scale Nearest Neighbor Search*, 8th IEEE Workshop on Application of Computer Vision (WACV'07). Feb. 2007, pp. 28-34, U.S.A.

Pierre Moulin et al., *Performance of Random Fingerprinting Codes Under Arbitrary Nonlinear Attacks*, IEEE International Conference on Acoustics Speech and Signal Processing, Apr. 2007, pp. II-157-II-160, vol. 2, Issue 15-20.

Ashwin Swaminathan et al., *Robust and Secure Image Hashing*, IEEE Transactions on Information Forensics and Security, Jun. 2006, pp. 215-230, vol. 1, No. 2.

Notice of Grounds for Rejection for Japanese Patent Application No. JP P2010-522089, Jan. 22, 2013, 6 Pages.

Patent Examination Report No. 2 for Australian Patent Application No. AU 2008288797, Feb. 19, 2013, 3 Pages.

\* cited by examiner

GENERATION OF MIN-HASH SIGNATURES

CROSS REFERENCE TO RELATED APPLICATIONS

This application claims the benefit of U.S. Provisional Application No. 60/957,445 entitled "Improved Distributions of Min-Hash Signatures" filed on Aug. 22, 2007, herein incorporated by reference.

BACKGROUND

1. Field of Art

The invention generally relates to comparing digital data, and more specifically to comparing digital data using signatures.

2. Description of the Related Art

A min-hash signature is a coding technique often used to quickly estimate similarities between two bit vectors or to quickly find approximate nearest neighbors from a set of bit vectors. By representing bit vectors using min-hash signatures, data can be compared far more efficiently than using direct bit-to-bit comparisons. Min-hash signatures are most often applied when the bit vector contains a large number of "expected values" relative to a number of "not-expected values". Typically, the "expected values" are represented by 0's in the bit vector and the "not-expected values" are represented by 1's in the bit vector, although other representations are possible. Example applications for min-hash signatures include quick comparisons of digital media files such as video, audio, images, or webpages.

The min-hash process generates a signature for a bit vector by sequentially applying a set of k permutations to the bits in the bit vector, where k is typically much less than the length of the bit vector. Each permutation defines a bit re-arrangement of the bits in the bit vector. After applying a permutation, the "min-hash" value is an outputted value corresponding to the bit location of the first '1' in the re-arranged bit vector. The sequence of min-hash values from the set of applied permutations collectively make up the min-hash signature. Thus, the min-hash process compresses a long bit vector to a more compact vector (the signature) with a length of k values. The signature is computed in such a way that the signatures retain a sufficient level of information about the original bit vectors to allow bit vectors to be compared by comparing only their signatures.

The magnitudes of the values obtained in the min-hash signature are related, in part, to the number of "1"s in the input bit vector relative to the length of the input bit vector. For example, a bit vector may, on average, have roughly ⅛, 1/20, or 1/80 of its bits correspond to "1"s. A larger fraction of "1"s generally results in lower average min-hash values because fewer bits are scanned (on average) before the first "1" is located. These low-valued entries are inherently less informative about the underlying sequence of bits in the original bit vector than high valued entries. To illustrate this concept, the min-hash process can be viewed as a variation of a run-length encoding. For example, a min-hash value of 50 indicates a run of 50 "0"s followed by a "1" in the re-arranged bit vector after applying a permutation. Given this single min-hash value, the values in the original sequence (50 "0"s and one "1") can be recovered. However, if the min-hash value indicates a run of zero "0"s, only the value for a single entry (the single "1") can be recreated. Thus, different min-hash values encode different amounts of information about the original bit vector, depending on the actual output value (with higher values encoding more information).

While low min-hash values have less discriminative power due to their relative lack of information about the input bit vector, high min-hash values are increasingly susceptible to distortion-induced errors. For example, consider the case where distortions are modeled as randomly distributed bit flips. The higher the "true" output value of the min-hash process, the more likely that a distortion will change that value, since there are more bits on which this value depends.

Thus, conventional min-hash processes are limited by an uneven distribution of information about the original bit vector (at low output values) and susceptibility to distortions or errors (at high output values).

SUMMARY

A method is disclosed for generating a signature representing an input bit vector. A signature generator generates a primary min-hash value based on a primary permutation. The primary min-hash value is compared to a threshold value. If the primary min-hash value is lower than the threshold value, a secondary min-hash value is generated based on a secondary permutation. The signature generator then determines one or more signature values based on the primary min-hash value, the secondary min-hash value, or both. The one or more signature values are stored as elements of the signature. The process repeats for each set of primary and secondary permutations to generate the full signature.

In one embodiment, the primary min-hash value is generated by applying the primary permutation to the input bit vector to generate a re-arranged bit vector. The re-arranged bit vector is scanned for the location of the first "1", and the location is recorded as the primary min-hash value. Secondary min-hash values can be determined using a similar process. In one embodiment, whenever a secondary min-hash value is generated, both the primary min-hash value and the secondary min-hash value are stored as elements of the signature. Alternatively, only the secondary min-hash value is stored and the primary min-hash value is discarded. In another embodiment, the secondary value is stored and a zero is stored in place of the primary value. In other embodiments, the primary value and the secondary value are combined according to a combining function (e.g., a 2:1 hash function) and the combined value is stored as an element of the signature.

In another embodiment, the signature generator further compares the secondary min-hash value to a secondary threshold. If the secondary min-hash value is greater than the secondary threshold, the signature generator subtracts the secondary threshold value from the secondary min-hash value, bit-reverses the difference, and stores the bit-reversed difference. If the secondary min-hash value is less than the secondary threshold, the signature generator stores a bitwise 'or' between the primary min-hash value and the bit-reversed secondary min-hash value.

In another embodiment, a min-hash value is generated using multiple levels of permutations. A first min-hash value is generated using a first permutation and the value is compared to a threshold value. Responsive to the min-hash value being less than the threshold value, another min-hash value is generated using another permutation. The number of permutations applied before an above-threshold min-hash value is found is tracked. Responsive to the min-hash value being above the threshold value, a signature value is stored based on the number of permutations applied before the above-threshold min-hash value is found.

In yet another embodiment, no threshold comparison is used. Instead, a primary min-hash value is generated based on application of a primary permutation to the input bit vector and a secondary min-hash value is generated based on application of a secondary permutation to the input vector. One or more signature values are then stored based on at least one of the primary min-hash value and the secondary min-hash value.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention provides a process for generating a signature of an input bit vector. A signature provides a compact representation of the bit vector and is computed in such a way that long bit vectors can be quickly compared by comparing their signatures. An example application is the quick indexing and comparison of video "fingerprints." Video fingerprints are bit vectors representing, for example, the spatial, sequential, and/or structural characteristics of video files. Other example applications include comparison of audio or other media files, web pages, DNA sequences, or other digital data.

Figure 1:
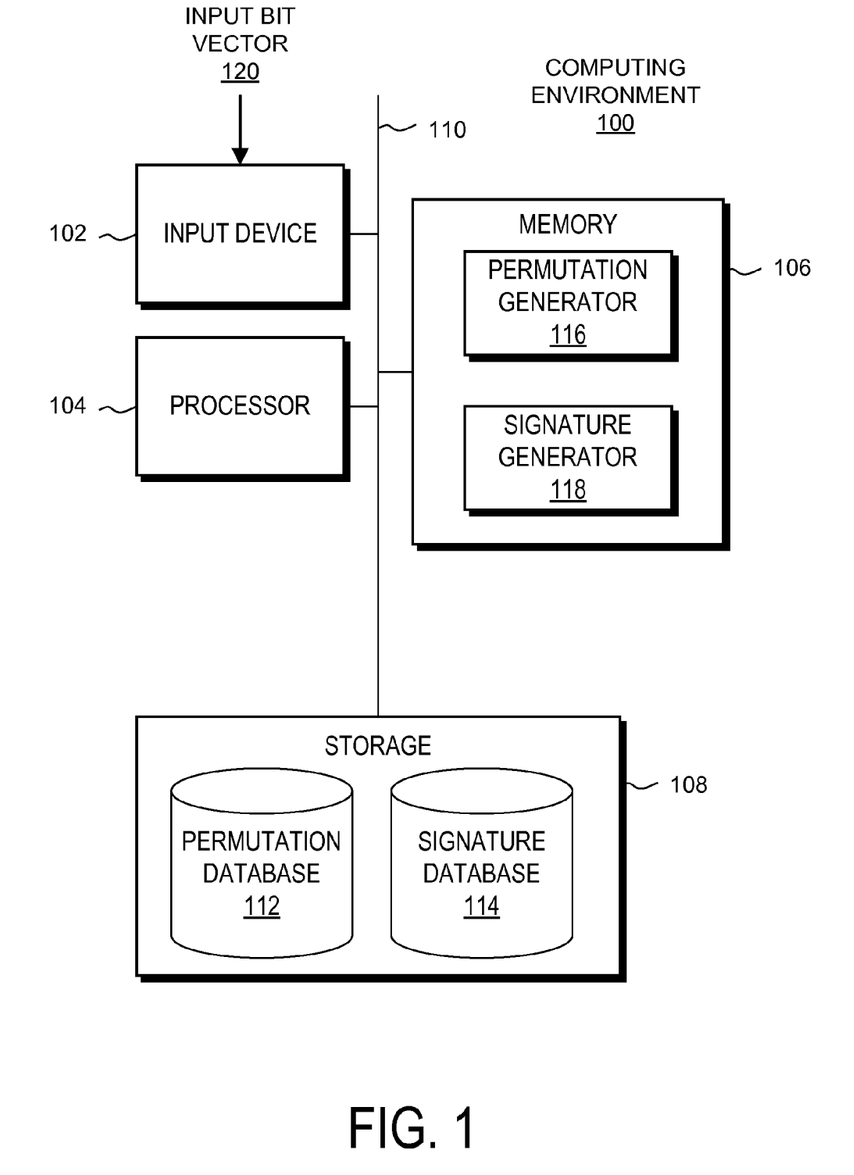
FIG. 1 is a block diagram illustrating a system for generating a signature from an input bit vector.

FIG. 1 illustrates an example computing environment 100 for generating a signature of a received input bit vector 120. The computing environment 100 comprises an input device 102, a processor 104, a memory 106, and storage 108 all coupled by a bus 110. The storage 108 comprises a permutation database 112 and a signature database 114. The storage 108 can be any device capable of storing data, such as a hard disk drive, a writable compact disk (CD) or DVD, or a solid-state memory device.

The input device 102 receives an input bit vector 120 for processing. The input bit vector 120 may be, for example, a fingerprint representation of an audio file, a video file, or other media file. In other embodiments, the input bit vector 120 can be any digital bit sequence suitable for signature generation. In one embodiment the input device 102 comprises a network interface card that communicates to a network via standard communications technologies and/or protocols. In another embodiment, the entities can use custom and/or dedicated data communications technologies.

The input bit vector 120 is processed by the processor 104 according to instructions stored in the memory 106. The processor 104 may be any general-purpose processor. The processor 104 processes the input bit vector 120 to produce a signature that can be used for quick and efficient comparison of bit vectors 120. The memory may be, for example, read-only memory (ROM), non-volatile random access memory (NVRAM), and/or RAM, and holds instructions and data used by the processor 104. In one embodiment, the memory 106 includes a permutation generator 116 and a signature generator 118. The permutation generator 116 stores computer executable instructions for generating a set of permutations that are applied to the input bit vector 120 to generate signatures. Once generated, permutations are stored in the permutation database 112. In an alternative embodiment, the permutations may be imported to the permutation database 112 via the input device 102 (e.g., from a network) rather than generated locally. The signature generator 118 comprises computer executable instructions for generating a signature of the input bit vector 120 using the permutations from the permutation database 112. In one embodiment, the signature generator 118 stores the generated signatures in a signature database 114. The signature database 114 maps the signature to a corresponding input bit vector 120. The signature database 114 may further include information about the origin of the bit vector 120 (e.g., that the bit vector 120 is a video fingerprint of a particular video segment).

Figure 2:
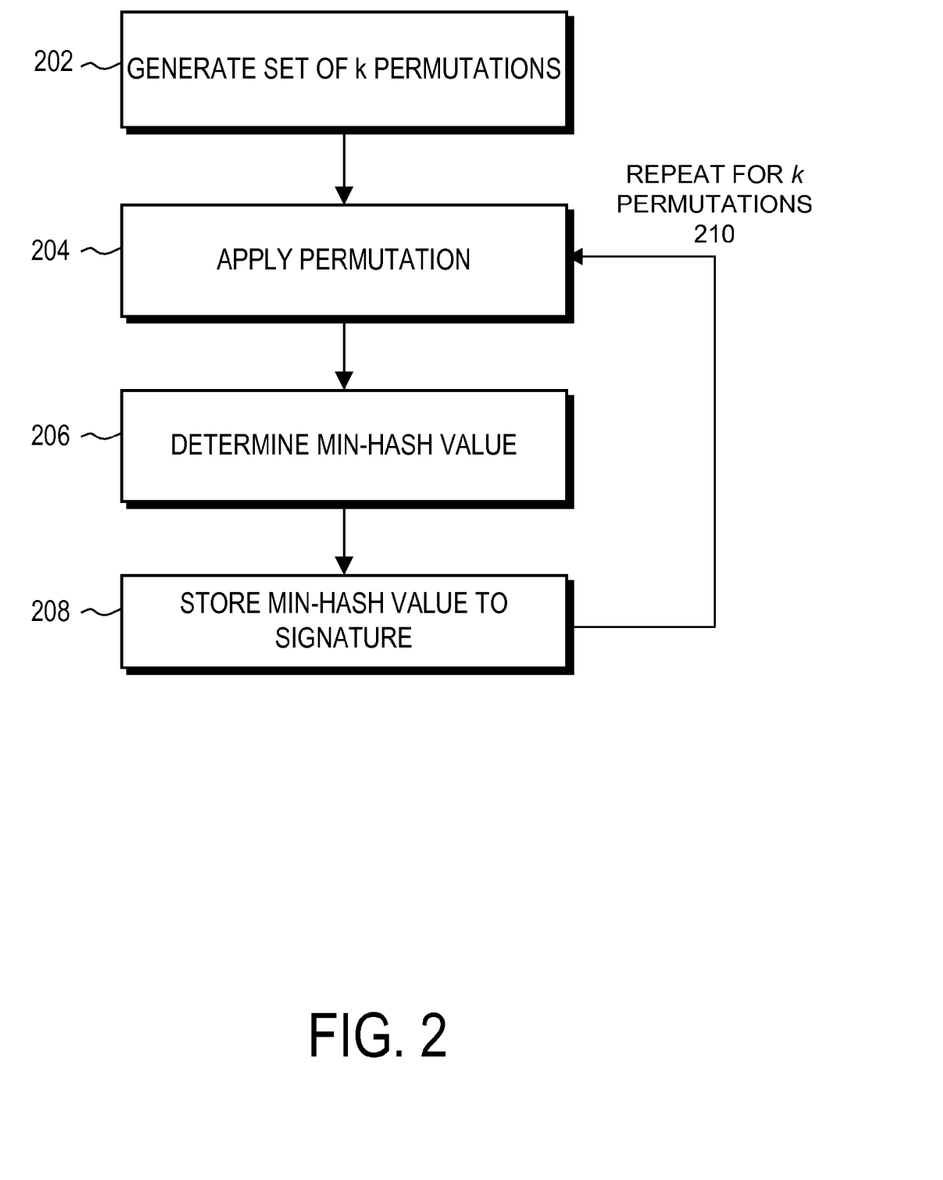
FIG. 2 is a flowchart illustrating a process for generating a min-hash signature from an input bit vector.

FIG. 2 is a flow chart illustrating an embodiment of a min-hash process for generating a signature of an input bit vector. First, a set of k permutations are generated 202. Each of the k permutations specifies a particular way of rearranging some elements (e.g., bits) of a vector. When a permutation is applied to a bit vector of length N, the permutation may be expressed as a sequence of integers between 1 and N in which the integers correspond to bit locations within the bit vector. Each such integer appears at most once in the permutation. Therefore, the permutation will have, at most, the length N. For example, when N=5, some valid permutations are (2, 4, 1, 5, 3), (1, 2, 3, 4), and (4, 2, 1). Using this representation, a permutation P={2, 7, 1, 5, 4, 8, 6, 3}, for example, indicates that the $1^{st}$ bit of the re-arranged bit vector is assigned the value of the $2^{nd}$ bit of the input bit vector, the $2^{nd}$ bit of the re-arranged bit vector is assigned the value of the $7^{th}$ bit of the input bit vector, and so on. Once defined, the permutations are typically fixed and applied in the same order to each of input vectors to be compared.

A permutation is applied 204 to re-arrange the bits of an input bit vector beginning with the first permutation from the set of k permutations. For example, when rearranging the sequence "ABCDE" according to the permutation (4, 2, 1), the arrangement "DBA" is obtained, since the first element of the permutation is 4 and the $4^{th}$ entry of the sequence is "D", and so on. The min-hash value is determined 206 from the location of the first not-expected ("1") value in the rearranged vector. Different techniques can be used to handle cases where no "1" appears in the rearranged sequence. For example, in one embodiment, the min-hash value is set to a special value indicating the absence of a "1". The determined min-hash value is then stored 208 as an element of the signature. This process of applying permutations and recording min-hash values then repeats 210 for each of the k permutations. The output is a min-hash signature having k values, with each value indicating a location of the first bit value of "1" in the underlying bit vector after applying each permutation.

Figure 3:
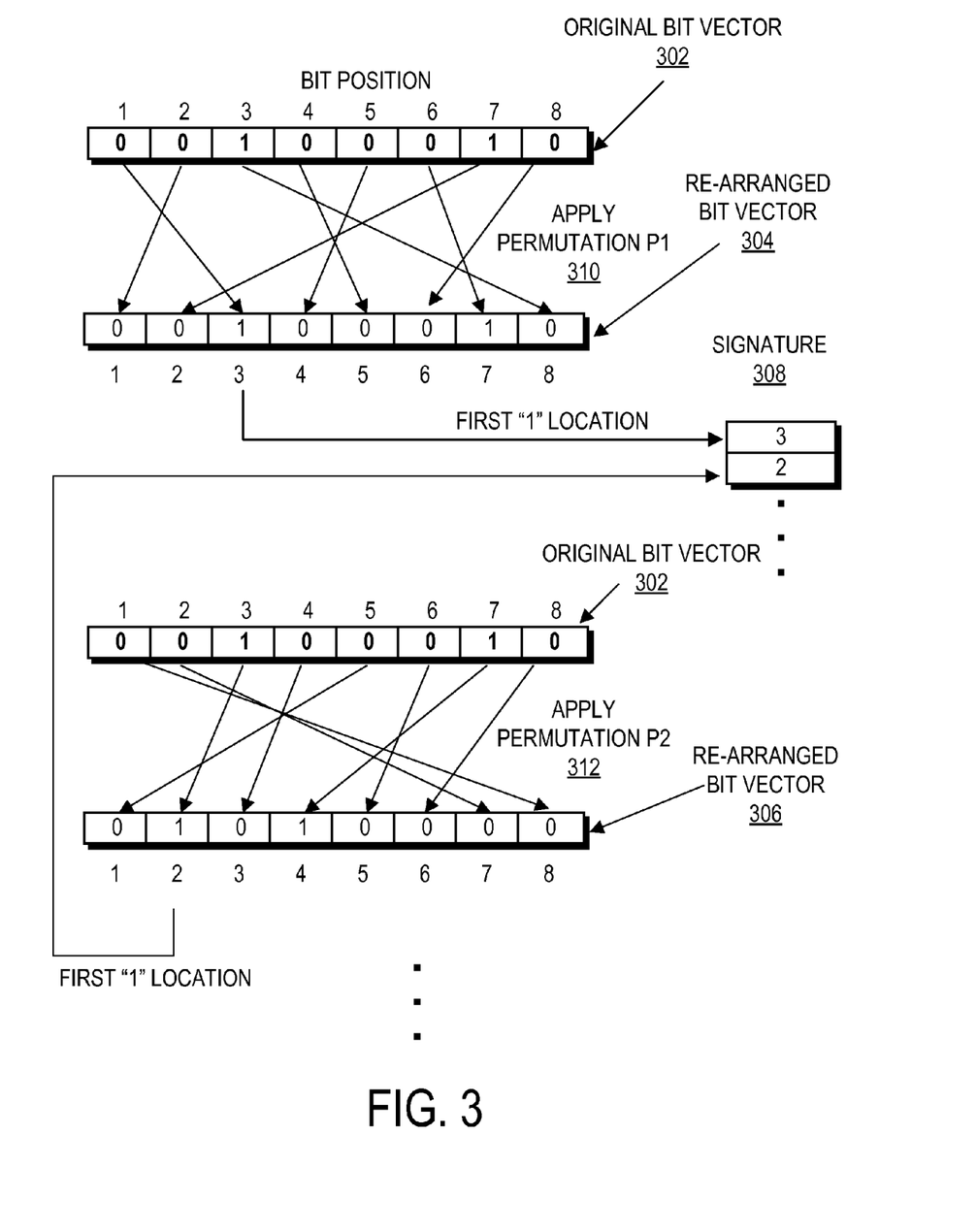
FIG. 3 is a diagram illustrating the generation of a signature from an input vector and a sequence of permutations.

Turning now to FIG. 3, the processes of applying 204 a permutation and determining 206 a min-hash value are illustrated for an example input bit vector 302 using example permutations P(1,1)={2, 7, 1, 5, 4, 8, 6, 3) and P(2,1)=(5, 3, 4, 7, 6, 8, 2, 1). As can be seen in the application 310 of P(1,1), the signature generator 118 assigns the $1^{st}$ bit of the re-arranged bit vector 304 to the value of the $2^{nd}$ bit of the original bit vector 302, the $2^{nd}$ bit of the re-arranged bit vector 304 is assigned the value of the $7^{th}$ bit of the original bit vector 302, and so on. The signature generator 118 then scans the re-arranged bit vector 304 for the location of the first "1". In the illustrated example, this location is found at bit position "3". Thus, the permutation module 114 records a value of "3" as the first entry of the signature 308. Next, the signature generator 118 applies 312 a second permutation P(2,1) to the original bit vector 302 to yield a second re-arranged bit vector 306. Again, the vector 306 is scanned for the location of the first "1" (in this case, position "2") and the position is recorded as the second entry of the signature 308. The process repeats for the remaining permutations to generate the full signature. Using the same fixed set of permutations, signatures can be generated for a plurality of input vectors representing for example, video fingerprints, audio fingerprints, or other digital data.

Once a set of signatures is generated for a set of different input bit vectors, the signatures can be compared using a number of different techniques to estimate nearest neighbors from the input data set. For example, in one embodiment, nearest neighbors are estimated according to a locality-sensitive hashing (LSH) process. In LSH, each signature is divided into a number of subgroups of min-hash values (or LSH "bands") with each subgroup containing a subset of adjacent min-hash values. For example, a first LSH band may comprise the first four min-hash values of the signatures, a second LSH band may comprise the next four min-hash values, and so on. The LSH process then estimates nearest neighbors between signatures based on similarities between subgroups in the same LSH bands. Alternatively, any number of other known techniques can be used to estimate nearest neighbors of the generated signatures.

Figure 4:
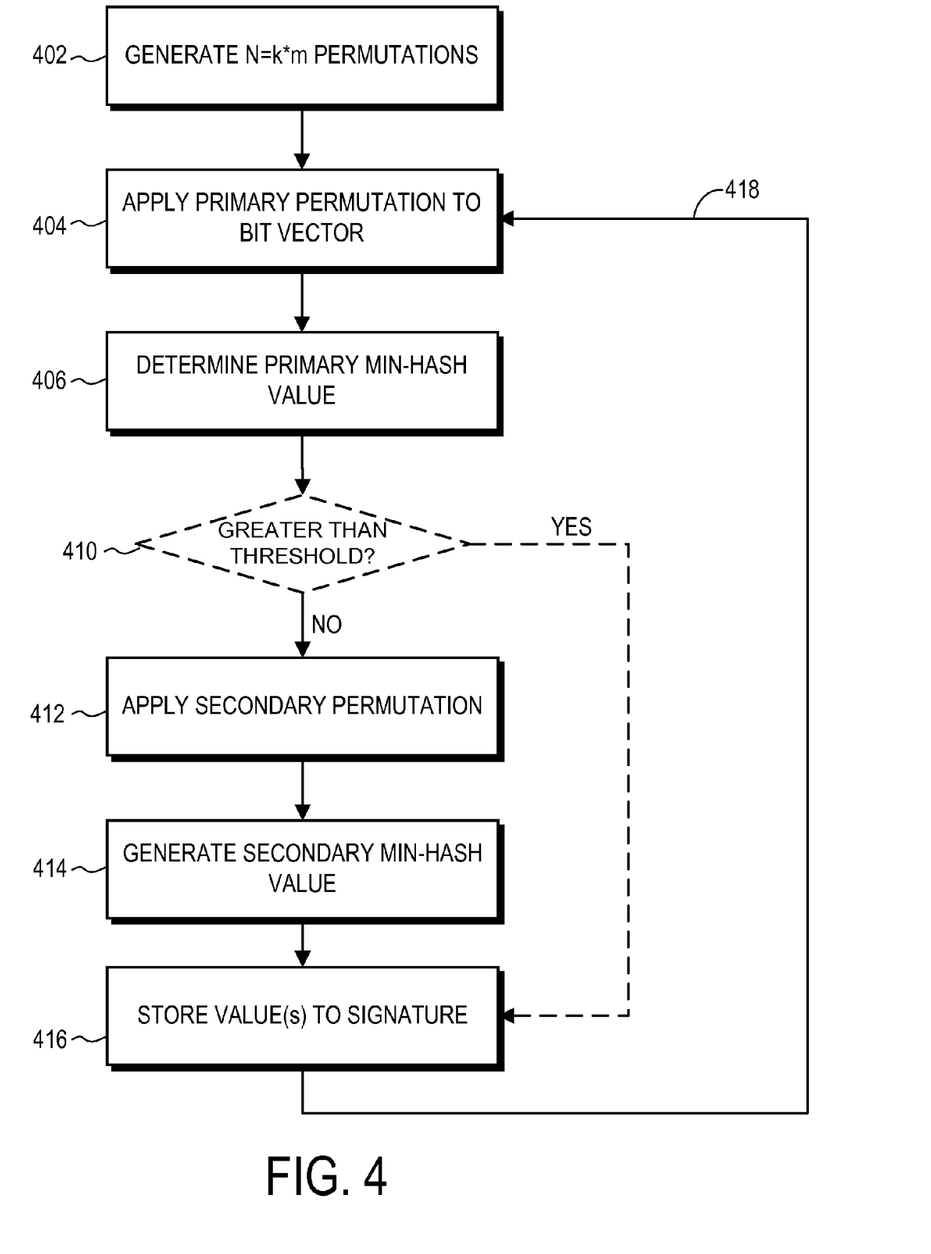
FIG. 4 is a flowchart illustrating another embodiment of a process for generating a signature using blocks of permutations.

FIG. 4 illustrates another embodiment of a process for generating a signature of an input bit vector 220. The permutation generator 116 generates 402 N permutations grouped into a number k blocks arranged in a defined order. Each permutation block, i, of the k permutation blocks comprises m permutations P(i,1) . . . P(i, m) in a defined order. In one embodiment, m=2, and each permutation block (or pair) contains 2 permutations, P(i, 1) and P(i,2). In this case, permutation P(i, 1) is designated as the primary permutation, and permutation P(i,2) is designated as the secondary permutation, collectively defining the ith permutation block. In alternative embodiment, a different number m of permutations may be used in each permutation block.

Each of the N=k*m permutations defines a bit re-arrangement of the bits of the input bit vector 120 as described above. The signature generator 118 applies 404 the primary permutation from the first permutation block to the input bit vector 120. The permutation rearranges the order of the bits in the input bit vector 120 to generate a re-arranged bit vector. The signature generator 118 then determines 406 the min-hash value from the re-arranged bit vector corresponding to the location (index) of the first "1" in the re-arranged bit vector.

Optionally, the signature generator 118 then compares 410 the primary min-hash value to a threshold value. In one embodiment, the threshold value is set in order to optimally maximize the information that can be retrieved from the signature while minimizing the susceptibility to noise. The threshold value is typically set high enough that ⅓ to ⅔ of the output-value distribution is below the threshold but low enough that the below-threshold output values are unlikely to be affected by noise. The best trade-off between these opposing factors may vary depending on the nature of the input vector 120 (e.g., video, audio, images, etc) and the memory and computational requirements under which the min-hash representation will be used. For example, if the final number k of min-hash values that can be saved independently in each signature is low compared to the number of candidates that the system will ultimately be able examine (due to computational or operating memory constraints), then this threshold would be set on the high end of this range to increase the discriminative power of each hash value. Alternately, if the original bit stream is more susceptible to noise-induced bit flips, then this threshold would be set on the low end of this range.

When the primary min-hash value is below the threshold, this indicates that the min-hash value provides only limited information about the underlying input bit vector 120. If the primary min-hash value is below the threshold, a secondary permutation is applied 412 to the original bit vector 120 and a secondary min-hash value is generated 414 on the permuted vector. If the primary min-hash value is greater than or equal to the threshold, then this indicates that the value is sufficiently informative and there is no need to generate the secondary min-hash. The signature generator 118 then stores 416 the primary and/or the secondary min-hash value (or a combination of the values) to the signature. Example techniques for storing the min-hash values to the signature are described in more detail below with reference to FIGS. 5A-C. The process then repeats 418 for each of the k permutations blocks until the full signature is generated.

In alternative embodiments, no comparison 410 to a threshold is made. Instead, steps 412 and 414 are carried out regardless of the primary min-hash value. Thus, in this embodiment, each of the k iteration always produces m min-hash values, one for each of the m permutations in the permutation block.

In other alternative embodiment, the steps may be applied in a different order. For example, one implementation first generates all of the primary min-hash values. Then, if a threshold comparison is used, secondary min-hash values are generated in a subsequent iteration for any permutation block that yielded an above threshold primary min-hash value. If no threshold comparison is used, secondary min-hash values are generated for all permutation blocks.

Regardless of the order of steps, the primary and secondary min-hash values are stored in the signature such that the primary and secondary pairs will be closely associated when the approximate nearest neighbor lookup technique is applied. Typically this is accomplished by interleaving the primary and secondary pairs in the stored signature. For example, if the min-hash signature is used with Locality-Sensitive Hashing (LSH), then the primary and associated secondary values would be stored adjacent to each other in the signature such that they fall within the same LSH band.

In alternative embodiments, multiple levels of additional permutations may be used in each block of permutations in addition to the primary and secondary permutations (in the case where m>2). For example, in one embodiment, the secondary min-hash value is also compared to a threshold value, and if the secondary min-hash value is below the threshold, a tertiary permutation is applied. The stored signature value may then be based on one or more of the primary, secondary, and tertiary min-hash values. In this case, the number of permutations that are generated is N=3k, instead of N=2k. As will be apparent to one of ordinary skill in the art, the process can be naturally extended to any number of permutations per block.

The step of generating 402 permutations is now described in more detail in accordance with an embodiment of the present invention. In one embodiment, the permutation generator 116 randomly generates the bit re-arrangements defined by each of the primary permutations P(1,1) ... P(k,1). The permutation generator 116 can generate the secondary (or other non-primary) permutations P(1, 2) ... P(k, 2) in a variety of different ways according to different embodiments. In a first embodiment, the bit re-arrangements defined in the each of secondary permutation P(1, 2) ... P(k, 2) are also generated randomly. In a second embodiment, the permutation generator 116 computes each secondary permutation P(i, 2) by taking the reverse ordering of the corresponding primary permutation P(i,1) in the same block. For example, if permutation P(i, 1) indicates a bit re-arrangement of P(i, 1)={2, 7, 1, 5, 4, 8, 6, 3}, then a corresponding secondary permutation P(i, 2) is chosen with the reverse order re-arrangement: P(i, 2)={3, 6, 8, 4, 5, 1, 7, 2}. This approach has the advantage of guaranteeing that the primary permutation P(i, 1) and secondary permutation P(i, 2) within the same permutation block will provide information about disjoint portions of the original input bit vector 120.

In another embodiment, instead of randomly generating permutations, permutations can be at least partially selected based on observed results. For example, if a particular sequence of permutations is found experimentally to yield signatures with undesirable characteristics, permutations in the sequence can be modified or replaced by different permutations. This can be formalized in a learning process that first selects sequences based on experimental results testing stability and discrimination. Other alternative embodiments for generating permutations are also possible without departing from the scope of the disclosure.

In many applications, the min-hash values generated from the permutations will be used in subgroups. For example, when used with LSH, the min-hash values outputted from the permutations are associated with LSH bands based on their locations within the signature. In these applications, the experiment-based permutation selection process can be further extended to include reordering permutations across this set of k permutations blocks, in order to optimize some desired characteristic. For example, the sequences can be reordered to minimize the mutual information that is contained across the permutations that are grouped into the same subgroup or "band". The advantage of this is more uniform distributions when each subgroup of permutations are used to sort and store the entries in the population under question.

In another embodiment, the permutation generator 116 creates doubly long permutations, by whatever method, and extracts, for example, even entries as primary permutations and odd entries as the secondary permutations. Note that a permutation can be shorter than the length of the bit vector. For example, a permutation of length 256 may be applied to an input vector of length 2000. In this case, a doubly-long permutation will have length 512. When there is a selection process used to create permutations as described above, this approach has the advantage of allowing the selection process to be used, unchanged, providing most of the benefits of the selection process to each (primary and secondary) permutation while still insuring that the primary and secondary permutations provide information about disjoint portions of the input bit stream. This approach can be naturally extended when longer series of permutations are used (e.g., $3^{rd}$-level, $4^{th}$ level, etc. in addition to primary and secondary permutations). For example, for 3 levels, each generated permutation is three times as long and each (primary, secondary, tertiary) is taken the triple length permutation by steps of 3. It is noted that in each of the embodiments above, once defined, the k permutation blocks (with m permutations in each of k blocks) are fixed and applied in the same order for each input vector 120 that is received by the system 100.

The signature generator 118 can optionally regulate the signature values to ensure that each entry is of a fixed length (for example, 8 bits). In one embodiment, the signature generator 118 clips the resulting signature value at a maximum value related to the fixed bit length. For example, if each signature entry is limited to an 8-bit value, any signature value above 255 is recorded as 255. In another embodiment, a different function can be used to reduce a signature value to a fixed length. For example, for a determined signature value, h>255, the signature value can be stored as h mod 255. As will be apparent to one of ordinary skill in the art, the signature generator 118 may apply a number of different functions to fix the length of the stored signature values.

Figure 5A:
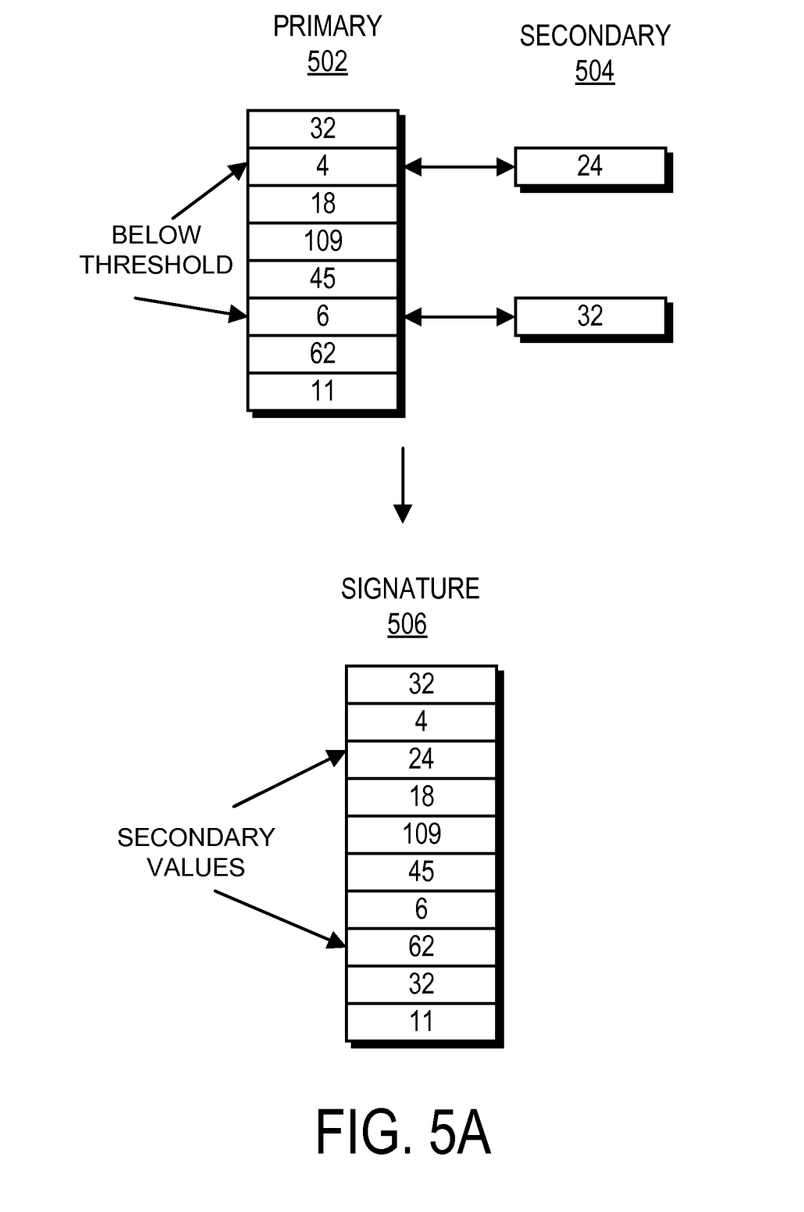
FIG. 5A is a diagram illustrating a first embodiment of a technique for storing min-hash values to a signature.

FIGS. 5A-5C illustrate examples of techniques for storing 416 a value to the signature based on the primary min-hash values and/or secondary min-hash values. The illustrated techniques can be naturally extended when additional levels of permutations are used (i.e. when m>2). In FIG. 5A, an example set of primary min-hash values 502 is illustrated corresponding to min-hash values generated from primary permutations P(1,1) ... P(8,1). The signature generator 118 uses a threshold value of "10" to determine whether or not to generate a secondary min-hash value from corresponding secondary permutations P(1,2) ... (P8,2). When the primary min-hash value is above the threshold, no secondary min-hash value is generated and the primary min-hash value is stored to the signature 506. When the primary min-hash value is below the threshold (values 4 and 6), the signature generator 118 generates corresponding secondary min-hash values 504. The signature generator 118 then stores both the primary min-hash values 502 and the secondary min-hash values 504 to the signature 506. The secondary values are typically interleaved with the primary values of the signature as illustrated. If the full min-hash signature is used in, for example, a locality-sensitive hashing, the secondary value is stored in such a way that it will remain in the same subgroup (LSH band) as the corresponding primary value. In the case where no threshold is used, secondary min-hash values are generated for each of the k blocks and the resulting signature is therefore of length 2k.

Figure 5B:
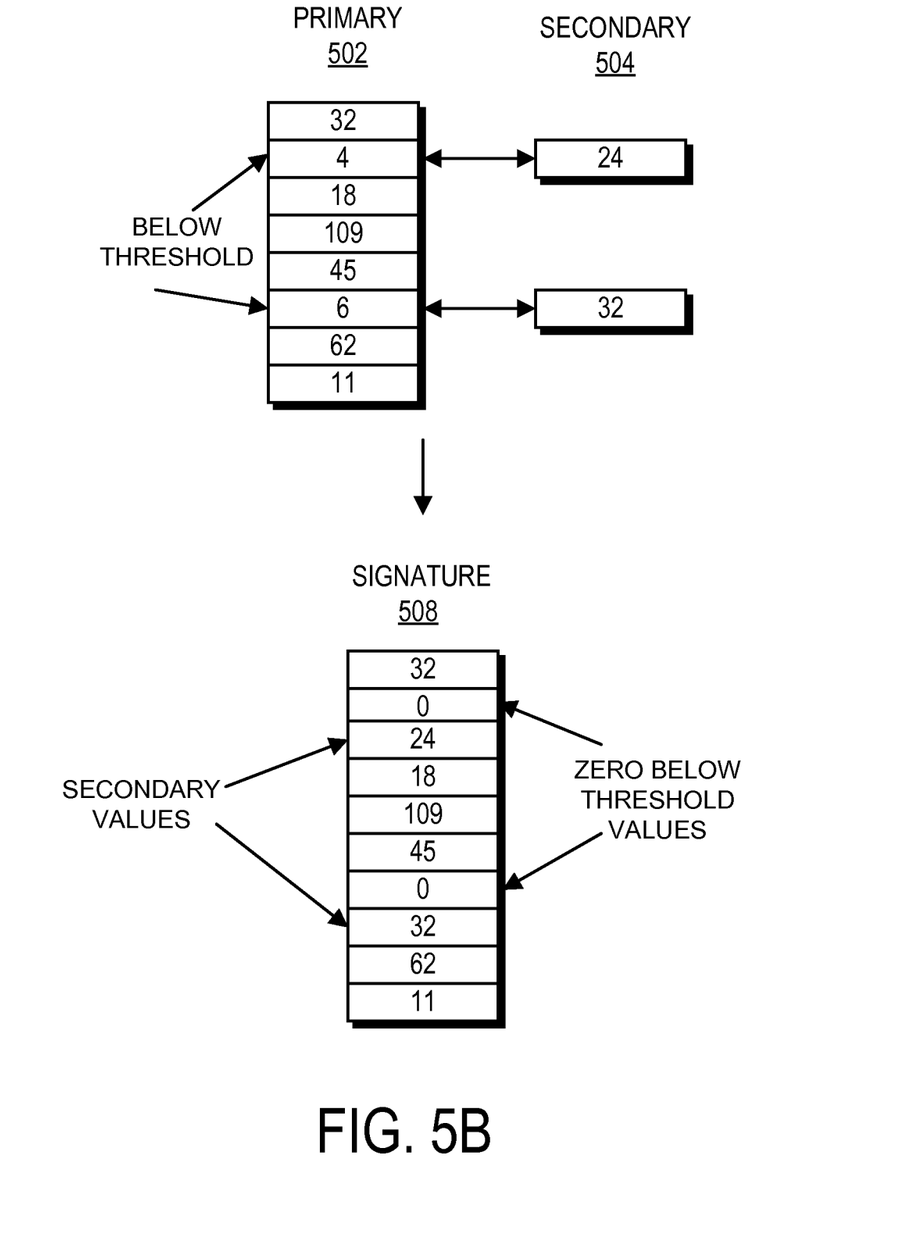
FIG. 5B is a diagram illustrating generation of a second embodiment of a technique for storing min-hash values to a signature.

A second embodiment is illustrated in FIG. 5B. Here, when the primary min-hash value is above the threshold, the signature generator 118 stores the primary value to the signature 508. When the primary min-hash value is below the threshold, the signature generator 118 stores the secondary min-hash value to the signature 508 and stores a zero in place of the below-threshold primary value. It is noted that in the examples of FIGS. 5A-B, the signatures 506, 508 can be of variable length, depending on the number of below-threshold values resulting from the primary permutations. The same interleaved ordering of primary and secondary values as mentioned above may be used in the example of FIG. 5B.

Figure 5C:
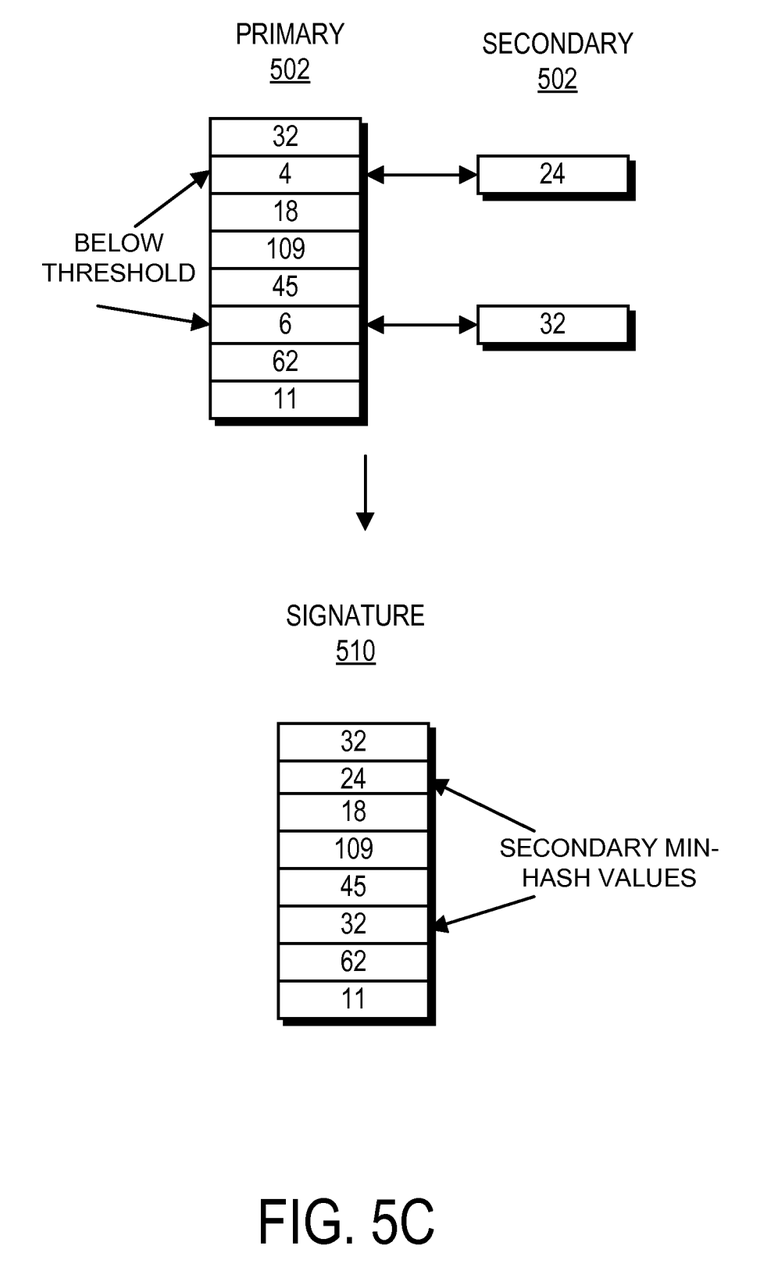
FIG. 5C is a diagram illustrating a third embodiment of a technique for storing determined min-hash values to a signature.

A third embodiment is illustrated in FIG. 5C. When the primary min-hash value is above the threshold, the signature generator 118 stores the primary value to the signature 510. When the primary min-hash value is below the threshold, the primary min-hash value is discarded and only the secondary min-hash value is stored to the signature 510. This technique ensures that the signature 510 is of a fixed length equal to the number k of permutations blocks.

In yet another embodiment, the signature generator 118 combines primary and secondary min-hash values accorded to a combining function. For example, a 2:1 hash function generates a combined value from the primary and secondary min-hash values. In one embodiment, when the primary min-hash value is below the threshold, the signature generator 118 stores both the primary value and the combined value to the signature. In another embodiment, the signature generator 118 stores the combined value to the signature and stores a zero in place of the primary value. In yet another embodiment, the signature generator 118 stores only the combined value and discards the primary value.

Figure 6:
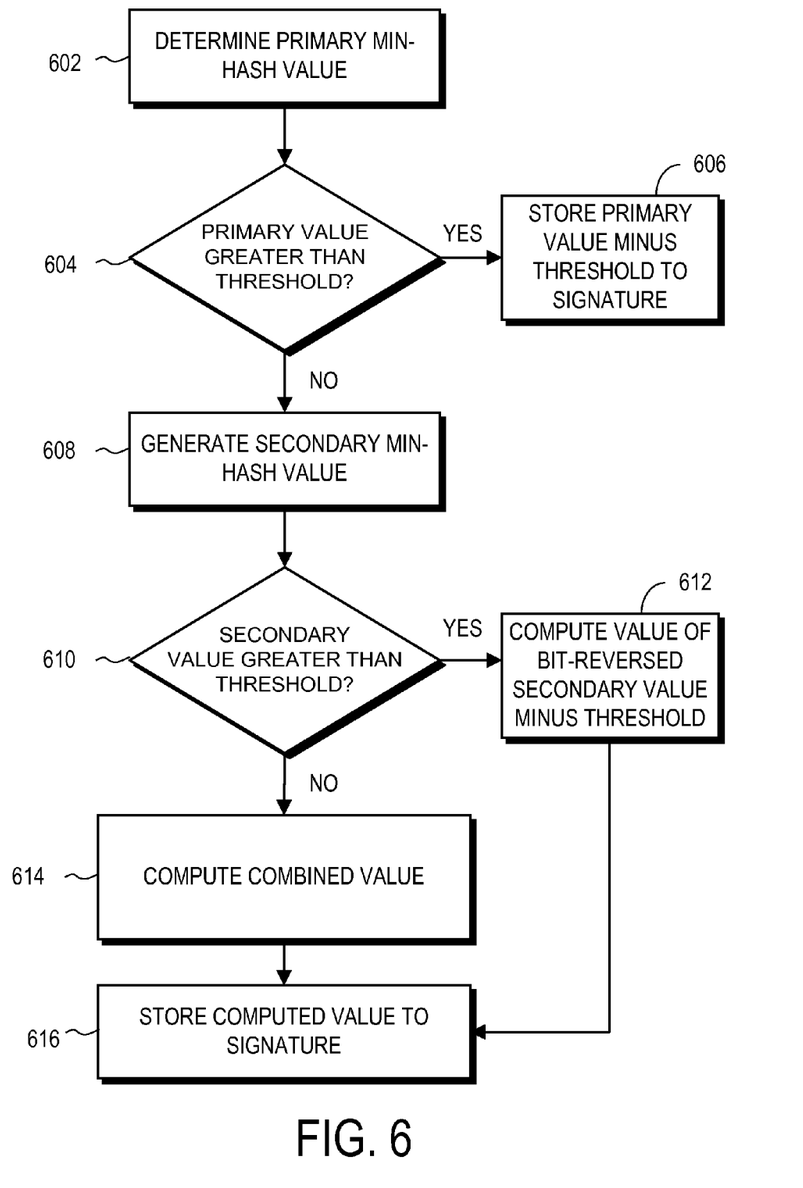
FIG. 6 is a flowchart illustrating another embodiment of a process for generating a signature using primary and secondary min-hash values.

FIG. 6 illustrates another process for generating a signature from primary and secondary min-hash values. First, the signature generator 118 determines 602 a primary min-hash value by applying a primary permutation to the original bit vector and recording the resulting min-hash value. The signature generator 118 compares 604 the primary min-hash value to a primary threshold value. If the primary min-hash value is greater than the primary threshold value, the signature generator 118 stores 606 the primary min-hash value minus that threshold as the signature entry. If the primary min-hash value is not greater than the primary threshold value, the signature generator 118 generates 608 a secondary min-hash value using the corresponding secondary permutation. The secondary min-hash value is then compared 610 to a secondary threshold value. This secondary threshold value may be different or the same as the primary threshold value. If the secondary min-hash value is greater than the threshold, the signature generator 118 subtracts the threshold value from the secondary min-hash value and then bit-reverses the difference (i.e., each 1 is set to 0 and each 0 is set to 1). This function is given by $2^n-1-h+t_s$ where n is the number of bits used to represent the secondary min-hash value h, and t is the threshold against which h was compared. If the secondary min-hash value is less than the threshold, the signature generator 118 computes 614 a combined value using the primary and secondary min-hash values. For example, in one embodiment, the combined value is a bitwise 'or' between the primary and the bit-reversed secondary min-hash value. In another embodiment, the signature generator 118 computes an 8-bit value with 7 bits representing the greater of the primary and secondary min-hash values and the $8^{th}$ bit indicating which value is higher (e.g., 0 for the primary and 1 for the secondary). The computed value from step 614 or 612 is stored 616 as the signature entry.

Figure 7:
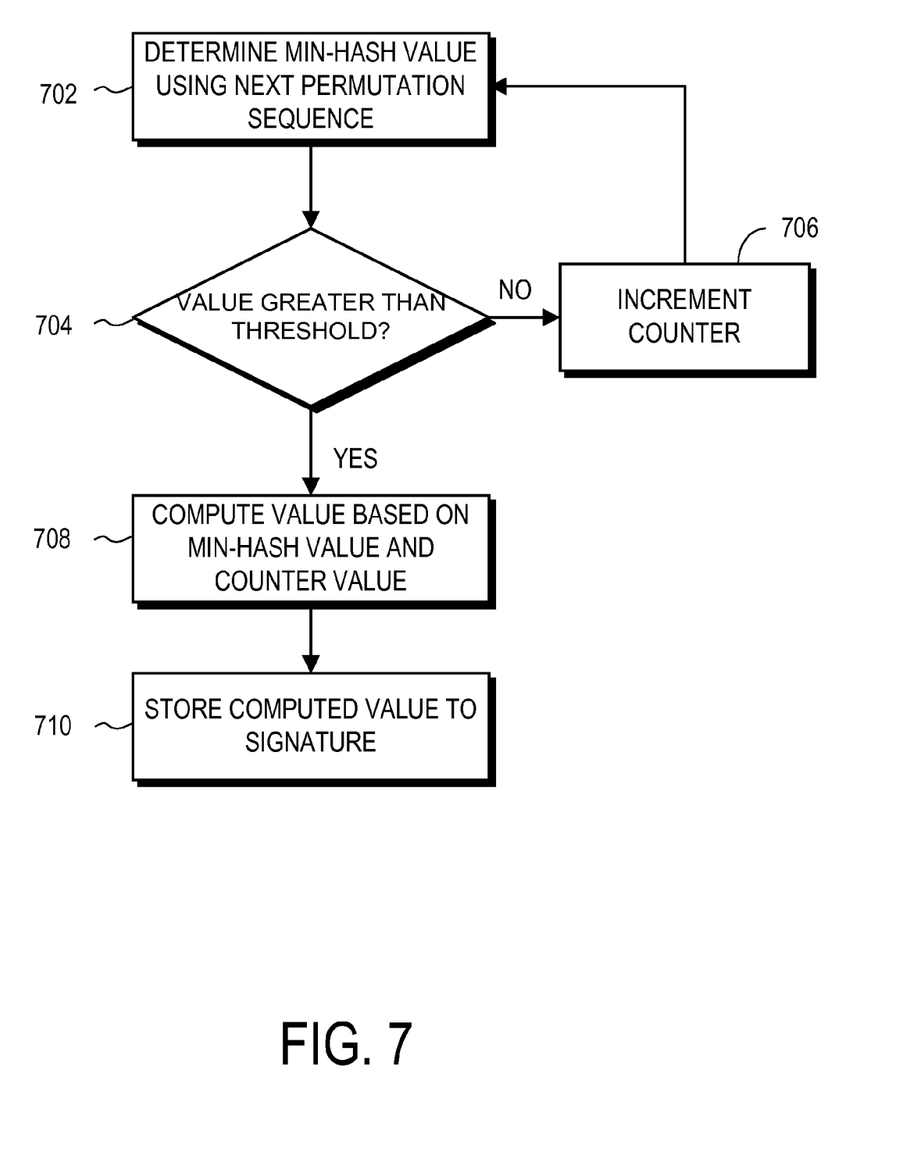
FIG. 7 is a flowchart illustrating another embodiment of a process for generating a signature using multiple levels of permutation sequences.

Another alternative embodiment is applicable when multiple levels of permutation are available beyond the primary and secondary permutations (i.e. when m>2). An embodiment of this process is illustrated in FIG. 7. A min-hash value is first determined 702 based on application of a first permutation (e.g., a primary permutation in the first iteration) to the input bit vector. The signature generator 118 compares 704 the min-hash value to a threshold value. If the min-hash value is lower than the threshold value, a counter is incremented 706. The process then repeats for the corresponding secondary permutation, tertiary permutation and so on until an above threshold min-hash value is found. The signature generator 118 then computes 708 a value based on the above threshold min-hash value and the counter value (the number of different permutations applied before an above-threshold value is found). For example, the computed value may be a bitwise 'or' between the above-threshold value and a bit-reversed counter value. The computed value is then stored 710 to the signature.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for generating a signature representing an input bit vector, wherein each bit of the input bit vector comprises either a first predefined value or a second predefined value, the second predefined value different than the first predefined value, the computer-implemented method comprising:
    applying a primary permutation to the input bit vector to generate a primary permuted input bit vector;
    generating a primary min-hash value based on a bit location of a sequentially first occurring bit in the primary permuted input bit vector that has said first predefined value;
    comparing, by a computing device, the primary min-hash value to a threshold value;
    responsive to the primary min-hash value being less than the threshold value, applying a secondary permutation to the input bit vector to generate a secondary permuted bit vector, and generating a secondary min-hash value based on a bit location of a sequentially first occurring bit in the secondary permuted input bit vector that has said first predefined value, wherein the secondary permutation is different than the primary permutation;
    determining one or more signature values based on at least one of the primary min-hash value and the secondary min-hash value; and
    storing the one or more signature values to a non-transitory computer readable storage medium as elements of the signature.

2. The method of claim 1, wherein the primary permutation and the secondary permutation each define a rearrangement of bits of the input bit vector.

3. The method of claim 1, wherein the secondary permutation comprises a reversed version of the primary permutation.

4. The method of claim 1, wherein storing the one or more signature values comprises storing both the primary min-hash value and the secondary min-hash value.

5. The method of claim 1, wherein storing the one or more signature values comprises storing the secondary min-hash value and storing a zero in place of the primary min-hash value.

6. The method of claim 1, wherein storing the one or more signature values comprises storing the secondary min-hash value and discarding the primary min-hash value.

7. The method of claim 1, wherein storing the one or more signature values comprises:
    combining the primary min-hash value and the secondary min-hash value according to a combining function to form a combined value; and
    storing the combined value.

8. The method of claim 1, further comprising:
    comparing the secondary min-hash value to a secondary threshold value;
    responsive to the secondary min-hash value being greater than the secondary threshold value, subtracting the threshold from the secondary min-hash value, bit-reversing the difference, and storing the bit-reversed difference; and
    responsive to the secondary min-hash value not being greater than the secondary threshold value, storing a bitwise 'or' between the primary min-hash value and the bit-reversed secondary value.

9. The method of claim 1, further comprising:
    comparing the secondary min-hash value to a secondary threshold value;
    responsive to the secondary min-hash value being less than the secondary threshold value, applying a tertiary permutation to the input bit vector to generate a tertiary permuted bit vector, and generating a tertiary min-hash value based on a bit location of a sequentially first occurring bit in the tertiary permuted input bit vector that has said first predefined value.

10. A non-transitory computer readable storage medium storing computer executable code for generating a signature representing an input bit vector, wherein each bit of the input bit vector comprises either a first predefined value or a second predefined value, the second predefined value different than the first predefined value, the computer executable program code when executed cause an application to perform steps of:
    applying a primary permutation to the input bit vector to generate a primary permuted input bit vector;
    generating a primary min-hash value based on a bit location of a sequentially first occurring bit in the primary permuted input bit vector that has said first predefined value;
    comparing the primary min-hash value to a threshold value;
    responsive to the primary min-hash value being less than the threshold value, applying a secondary permutation to the input bit vector to generate a secondary permuted bit vector, and generating a secondary min-hash value based on a bit location of a sequentially first occurring bit in the secondary permuted input bit vector that has said first predefined value, wherein the secondary permutation is different than the primary permutation;
    determining one or more signature values based on at least one of the primary min-hash value and the secondary min-hash value; and
    storing the one or more signature values as elements of the signature.

11. The non-transitory computer readable storage medium of claim 10, wherein the primary permutation and the secondary permutation each define a rearrangement of bits of the input bit vector.

12. The non-transitory computer readable storage medium of claim 10, wherein the secondary permutation comprises a reversed version of the primary permutation.

13. The non-transitory computer readable storage medium of claim 10, wherein storing the one or more signature values comprises storing both the primary min-hash value and the secondary min-hash value.

14. The non-transitory computer readable storage medium of claim 10, wherein storing the one or more signature values comprises storing the secondary min-hash value and storing a zero in place of the primary min-hash value.

15. The non-transitory computer readable storage medium of claim 10, wherein storing the one or more signature values comprises storing the secondary min-hash value and discarding the primary min-hash value.

16. The non-transitory computer readable storage medium of claim 10, wherein storing the one or more signature values comprises:
    combining the primary min-hash value and the secondary min-hash value according to a combining function to form a combined value; and
    storing the combined value.

17. The non-transitory computer readable storage medium of claim 10, wherein the computer executable program code when executed further causes the application to perform steps including:
    comparing the secondary min-hash value to a secondary threshold value;
    responsive to the secondary min-hash value being greater than the secondary threshold value, subtracting the threshold from the secondary min-hash value, bit-reversing the difference, and storing the bit-reversed difference; and
    responsive to the secondary min-hash value not being greater than the secondary threshold value, storing a bitwise 'or' between the primary min-hash value and the bit-reversed secondary value.

18. The non-transitory computer readable storage medium of claim 10, wherein the computer executable program code when executed further causes the application to perform steps including:
    comparing the secondary min-hash value to a secondary threshold value;
    responsive to the secondary min-hash value being less than the secondary threshold value, applying a tertiary permutation to the input bit vector to generate a tertiary permuted bit vector, and generating a tertiary min-hash value based on a bit location of a sequentially first occurring bit in the tertiary permuted input bit vector that has said first predefined value.

* * * * *